US008043678B2

(12) United States Patent
Utsumi et al.

(10) Patent No.: US 8,043,678 B2
(45) Date of Patent: Oct. 25, 2011

(54) RADOME AND METHOD OF PRODUCING THE SAME

(75) Inventors: Shigeru Utsumi, Tokyo (JP); Muneo Murakami, Tokyo (JP); Kimihiro Kaneko, Tokyo (JP); Teruhiko Kumada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 364 days.

(21) Appl. No.: 12/260,598

(22) Filed: Oct. 29, 2008

(65) Prior Publication Data

US 2009/0148681 A1 Jun. 11, 2009

(30) Foreign Application Priority Data

Dec. 7, 2007 (JP) ................................ 2007-316821

(51) Int. Cl.
*B60R 21/16* (2006.01)

(52) U.S. Cl. ..................... 428/36.1; 428/34.1; 428/35.7; 428/76; 442/246; 442/131; 442/170; 343/872; 156/299; 156/242; 264/478; 264/513; 264/511

(58) Field of Classification Search ................. 428/34.1, 428/35.7, 36.1, 76; 343/872, 909, 911 R; 442/246, 104, 131, 132, 133, 170; 156/299, 156/242; 264/478, 513, 511
See application file for complete search history.

(56) References Cited

U.S. PATENT DOCUMENTS

| | | | | |
|---|---|---|---|---|
| 5,408,244 | A | 4/1995 | Mackenzie | |
| 7,196,025 | B2 * | 3/2007 | Sahlin et al. | 442/246 |
| 7,242,365 | B1 | 7/2007 | Boatman et al. | |
| 2004/0219851 | A1 | 11/2004 | Sahlin et al. | |

FOREIGN PATENT DOCUMENTS

| | | |
|---|---|---|
| JP | 01-138238 | 5/1989 |
| JP | 6-10233 | 1/1994 |
| JP | 08-276441 | 10/1996 |
| JP | 10-226941 | 8/1998 |
| JP | 2007-519298 | 7/2007 |
| JP | 2009-540101 | 11/2009 |
| WO | WO 2005/015683 A1 | 2/2005 |
| WO | WO 2007/021611 A1 | 2/2007 |

OTHER PUBLICATIONS

David S. Cordova et al, "A Review of Ultra High Modulus Polyethylene Fiber Reinforced Composites for Electromagnetic Window Applications", 37th International Sampe Symposium, Mar. 9-12, 1992, pp. 1406-1420.
Search Report issued on Mar. 9, 2011, in counterpart European Patent Application No. 08169832.6 (6 pages).
Office Action issued Jul. 5, 2011 in Japanese Application No. 2007-316821 filed Dec. 27, 2007 (w/English translation).

* cited by examiner

*Primary Examiner* — Michael C Miggins
(74) *Attorney, Agent, or Firm* — Oblon, Spivak, McClelland, Maier & Neustadt, L.L.P.

(57) ABSTRACT

The present invention relates to a radome which has excellent transmission loss of radio waves and structural strength, which can be easily produced, and which has favorable workability, and a method of producing the same. The radome includes an olefin woven material and a glass cloth, in which the olefin woven material and the glass cloth are impregnated with a matrix resin to be integrated with each other, and the glass cloth is disposed closer to an inner side of the radome than the olefin woven material. As the olefin woven material, a woven material formed of an ultrahigh molecular weight polyethylene fiber can be used. As the matrix resin, an epoxy resin, a vinyl ester resin, an unsaturated polyester resin, or a silicone resin can be used.

8 Claims, 4 Drawing Sheets

RADOME AND METHOD OF PRODUCING THE SAME

BACKGROUND OF THE INVENTION

1. Field of the Invention

The present invention relates to a radome for protecting a radio wave device from the outside environment, and a method of producing the same. More particularly, the present invention relates to a radome for use in aircraft, vehicles, etc., and a method of producing the same.

2. Description of the Related Art

Radomes must not block the radio waves to be received, transmitted, or received/transmitted by a radio wave device and must have the structural strength required to protect the radio wave device from the outside environment. Mentioned as a conventional radome having such properties there are radomes using a composite material having reinforced fiber in a matrix resin, i.e., a single layer panel formed of a fiber reinforced plastic. Moreover, there are also radomes using sandwich structure panels in which a core formed of a low density dielectric such as a foamed body is sandwiched between a first composite material facing having a reinforced fiber in a matrix resin and a second composite material facing opposite to the first composite material facing (e.g., see JP 2007-519298 T). Such sandwich structure panels can reduce the dielectric constant as a whole while maintaining the structural strength by sandwiching a low density dielectric therein. Therefore, the sandwich structure panels can improve the transmission loss of radio waves to thereby improve the properties of a radome as compared with a single layer panel formed of a fiber reinforced plastic.

Here, as the reinforced fiber, a glass fiber is generally used. From the viewpoint of further reducing the dielectric constant, it is also known to use a fiber such as polyester-polyarylate fibers and ultrahigh molecular weight olefin fibers in which the dielectric constant of the fiber itself is low (e.g., JP 2007-519298 T and JP 06-10233 A).

However, in the case of using a fiber reinforced plastic in which a glass fiber is used as a reinforced fiber, a large amount of glass fiber needs to be added to a matrix resin so as to achieve the rigidity required in a radome. Since the dielectric constant of generally-used glass is about 4 to about 7 (e.g., the dielectric constant of E-Glass which is a glass fiber generally used for electrical applications is 6.6), such a fiber reinforced plastic cannot reduce the dielectric constant. Thus, a radome using such a material has increased transmission loss of radio waves.

In contrast, in the case of using, as a reinforced fiber, an organic fiber having a low dielectric constant such as polyester-polyarylate fibers and ultrahigh molecular weight olefins, the dielectric constant can be reduced. However, since organic fibers having a low dielectric constant generally have a weak adhesion force with a matrix resin, the interface between the organic fiber and the matrix becomes slippery. As a result, a radome using such a material is likely to suffer from plastic deformation when distortion in the bending direction is applied by a load such as wind.

Moreover, by the use of a glass cloth as a reinforced fiber for the composite material facing of the sandwich structure panels of JP 2007-519298 A, plastic deformation can be prevented. However, since the dielectric constant of the core is considerably different from the dielectric constant of the composite material facing, reflection is likely to occur when a radio wave transmits between the composite material facing and the core and, moreover, the number of side lobes increases remarkably, resulting in increased transmission loss of radio waves.

Further, a method of producing a radome using sandwich structure panels has problems with workability. More specifically, although it is possible to form a radome having a curved surface shape, it is difficult to form a radome having an angled portion. Specifically, when the core material of the sandwich structure panels is folded or two or more of the core materials are connected in producing the sandwich structure panels, the density becomes coarse due to the formation of cracks and compression parts in the core material, which become a singular point of the dielectric constant, resulting in increased transmission loss of radio waves. Moreover, in the method of producing a radome using sandwich structure panels, the first composite material facing, the second composite material facing, and the core are produced separately, and then the composite material facings and the core need to be laminated with each other, giving rise to problem that the production process is complicated.

The present invention has been made in order to solve the above-mentioned problems. An object of the present invention is to provide a radome which has excellent transmission loss of radio waves and structural strength, which can be easily produced, and which has favorable workability, and a method of producing the same.

SUMMARY OF THE INVENTION

The inventors of the present invention have conducted extensive research in order to solve the above-mentioned problems. As a result, the inventors of the present invention found that: by impregnating an olefin woven material and a glass cloth with a matrix resin to thereby integrate them, changes in the dielectric constant in a radome material can be reduced while reflecting the low dielectric constant of the olefin woven material; and by disposing a glass cloth at the inner side of a radome where the radome is most severely distorted by a load applied to the radome in the bending direction from the outside environment side, the glass cloth and the matrix resin easily form a hydrogen bond to thereby increase the structural strength, to thus accomplish the present invention.

That is, the present invention provides a radome comprising an olefin woven material and a glass cloth, in which the olefin woven material and the glass cloth are impregnated with a matrix resin to be integrated with each other, and the glass cloth is disposed closer to an inner side of the radome than the olefin woven material.

Further, the present invention provides a method of producing a radome comprising laminating an olefin woven material and a glass cloth to form a laminate, disposing the laminate in a mold, injecting the matrix resin in the mold while evacuating the inside of the mold, and curing the matrix resin.

The present invention can provide a radome which has excellent transmission loss of radio waves and structural strength, which can be easily produced, and which has favorable workability, and a method of producing the same.

DETAILED DESCRIPTION OF THE PREFERRED EMBODIMENTS

Embodiment 1

Figure 1:
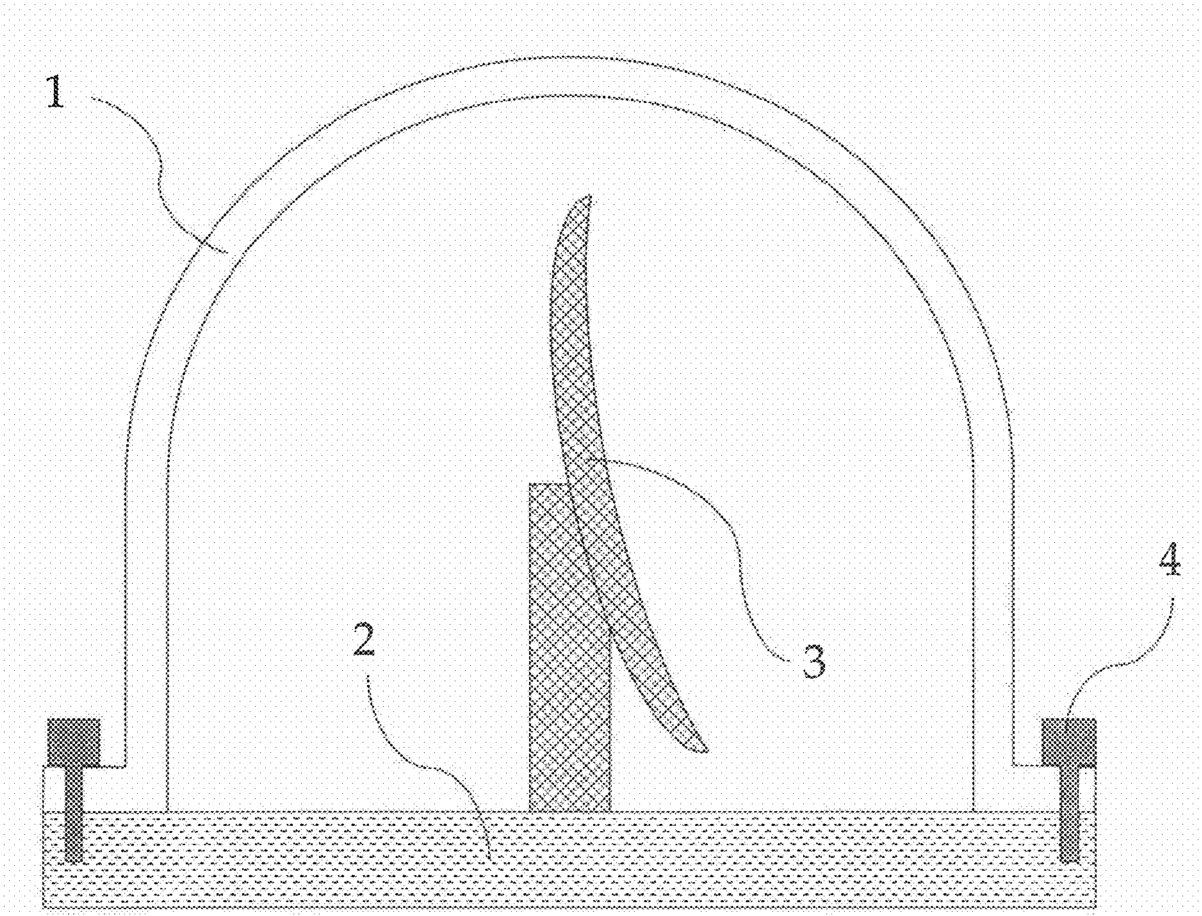
FIG. 1 is a view for explaining a radome according to Embodiment 1.

FIG. 1 is a view for explaining a radome according to this embodiment. In FIG. 1, a radome 1 is fixed to a base 2 with fixing screws 4, and a radio wave device 3 containing an antenna is disposed inside the radome 1.

The radome 1 protects the radio wave device 3 from the outside environment (e.g., natural environment such as wind, sunlight, rain, and seawater, impact from the outside, and dust). When a radio wave is received/transmitted between the outside and the antenna, the radio wave passes through the radome 1. Here, although the shape of the radome 1 may be suitably determined, if the radio wave device 3 moves, the radome 1 must be structured in such a manner that it does not interfere with the radio wave device 3. Moreover, the radome I is disposed in such a manner that the distance from the central part of the antenna to the radome 1 is as equal as possible in the direction of the output radio wave of the antenna and that a radio wave enters perpendicular to the radome 1.

In order for a radio wave to pass through the radome 1, a dielectric may be chosen as a material to be used in the radome 1. However, in order for a radio wave to reach a distant place and to receive a very weak radio wave, a material with little radio wave transmission loss needs to be used. Then, there is a method of reducing the transmission loss due to reflection by reducing the dielectric constant of a material used for the radome 1 so that it is close to the dielectric constant of air. Moreover, there is also a method of reducing the heat loss of the radome 1 by using a material with little dielectric loss as a material for the radome 1 or reducing the thickness of the radome 1. It should be noted that when the thickness of the radome 1 is reduced, it is also necessary to increase the rigidity of the material used for the radome 1.

Figure 2:
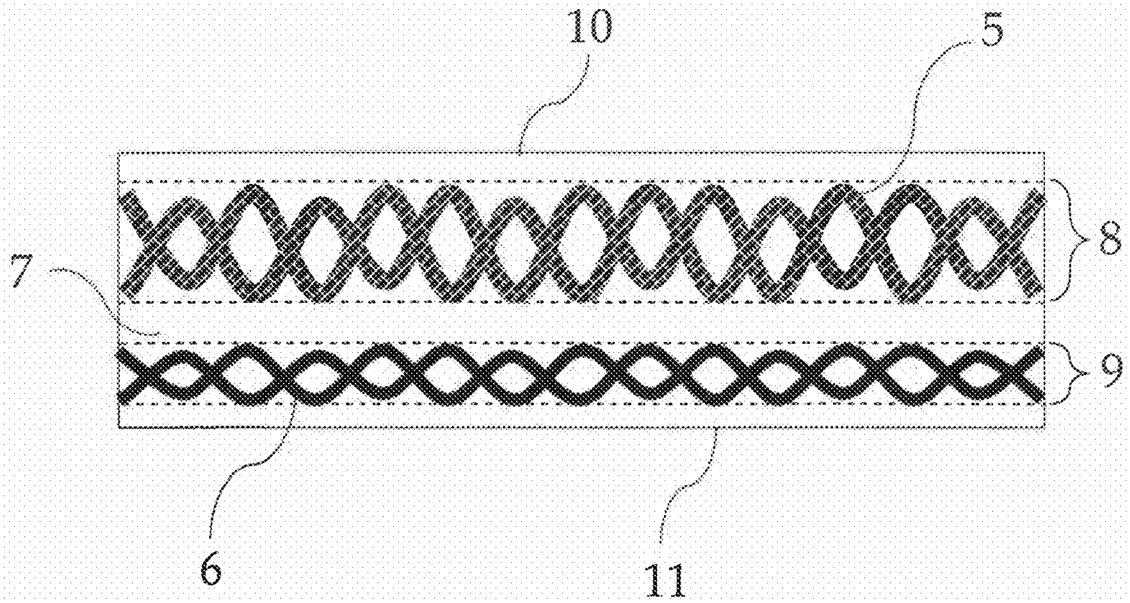
FIG. 2 is an enlarged cross sectional view illustrating a part of the radome according to Embodiment 1.

FIG. 2 is an enlarged cross sectional view illustrating a part of the radome according to this embodiment. In FIG. 2, the radome 1 is formed of a substance obtained by impregnating an olefin woven material 5 and a glass cloth 6 with a matrix resin 7 to be integrated with each other. The glass cloth 6 is disposed closer to the inner side of the radome than the olefin woven material 5. The inner side of the radome as used herein refers to the side in contact with the internal space of the radome 1 where the radio wave device 3 is disposed.

A portion where the olefin woven material 5 has been impregnated with the matrix resin 7 forms an olefin woven material-containing area layer 8, and a portion where the glass cloth 6 has been impregnated with the matrix resin 7 forms a glass cloth-containing area layer 9. It should be noted that since the olefin woven material 5 and the glass cloth 6 are integrated with each other using a single matrix resin 7, the boundaries of each of the olefin woven material-containing area layer 8 and the glass cloth-containing area layer 9 are not clear.

Further, the outside environment is in contact with a radome outer surface 10, and the internal space where the radio wave device 3 is disposed is in contact with a radome inner surface 11. It should be noted that, although FIG. 2 illustrates one olefin woven material 5 and one glass cloth 6, a plurality of olefin woven materials 5 and glass cloth 6 may be used insofar as the positional relationship between the olefin woven material 5 and the glass cloth 6 is satisfied.

In the radome 1, since the radio wave from the antenna enters perpendicular to the radome 1, the main transmission direction of the radio wave is the thickness direction of the radome 1.

Figure 3:
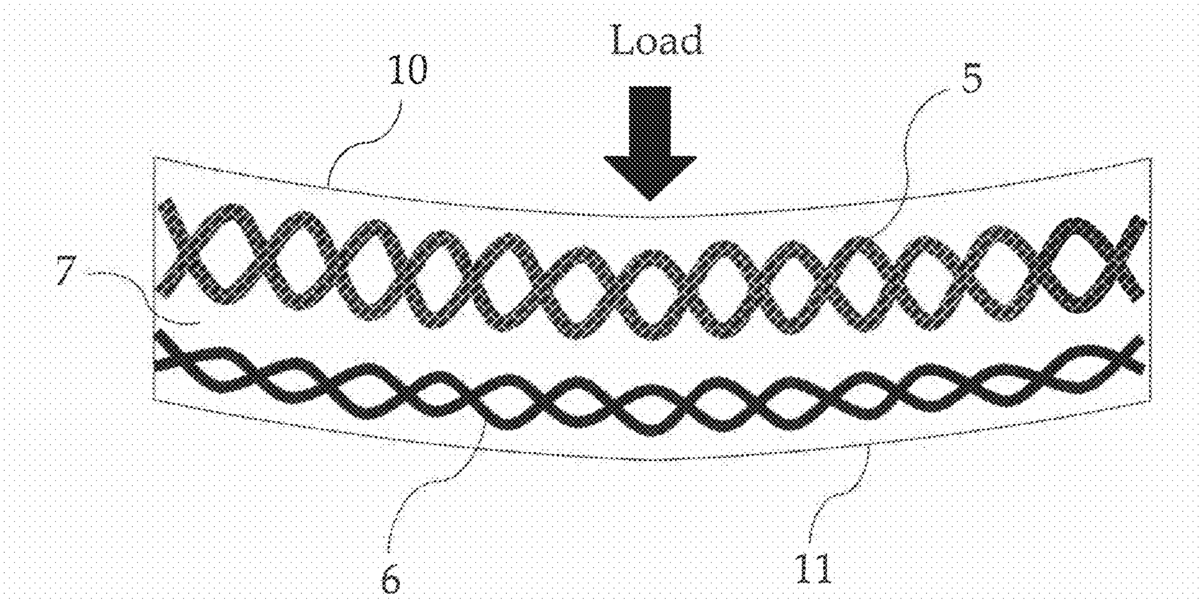
FIG. 3 is an enlarged cross sectional view illustrating a part of the radome according to Embodiment 1 when a load is applied to the radome in a thickness direction from the outside environment side.

When a load is applied to the radome 1 in the thickness direction from the outside environment side by wind or the like, the radome 1 is distorted in the thickness direction; the compressive strain in the plane direction becomes large in the vicinity of the radome outer surface 10; and the elongation strain in the plane direction becomes large in the vicinity of the radome inner surface 11 as illustrated in FIG. 3.

Figure 4:
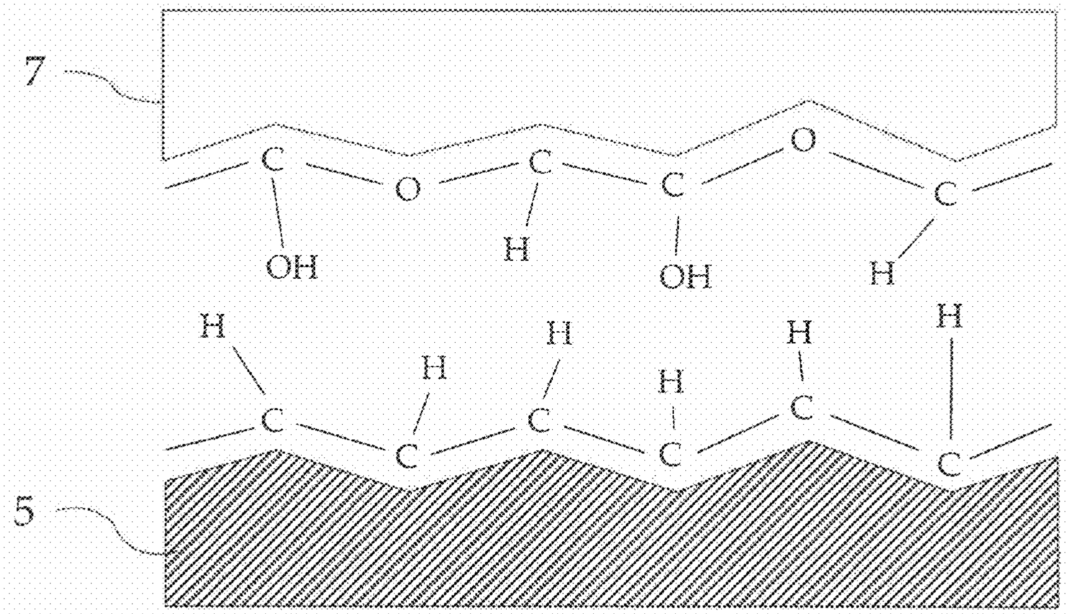
FIG. 4 is a schematic view of an interface between the olefin woven material and the matrix resin in the radome according to Embodiment 1.

Here, the interface between the olefin woven material 5 and the matrix resin 7 is schematically illustrated in FIG. 4. The olefin woven material 5 has a low dielectric constant because the olefin woven material 5 has an outermost surface with a molecular structure in which there are few or no functional groups other than C—H and there are no polar groups. However, since the olefin woven material 5 has an outermost surface with a molecular structure in which there are few or no functional groups other than C—H, neither a chemical bond nor a hydrogen bond is formed between the olefin woven material 5 and the matrix resin 7. Thus, van der Waals force, which is very weak force as compared with the above-mentioned bindings, serves as the main adhesion force between the olefin woven material 5 and the matrix resin 7. Therefore, stress occurs in the interface between the olefin woven material 5 and the matrix resin 7, and sliding is likely to occur. Thus, the stress is not transmitted to the olefin woven material 5. Moreover, the molecular structure of the outermost surface of the olefin woven material 5 can be reformed by subjecting the olefin woven material 5 to surface treatment such as corona discharge treatment. However, the adhesion force is not sufficient. As a result, the matrix resin 7 is destroyed, resulting in the occurrence of plastic deformation. The plastic deformation is likely to occur particularly when the volume fraction of the olefin woven material 5 to the matrix resin 7 is increased so as to reduce the dielectric constant or when a load is applied in the compression direction.

Figure 5:
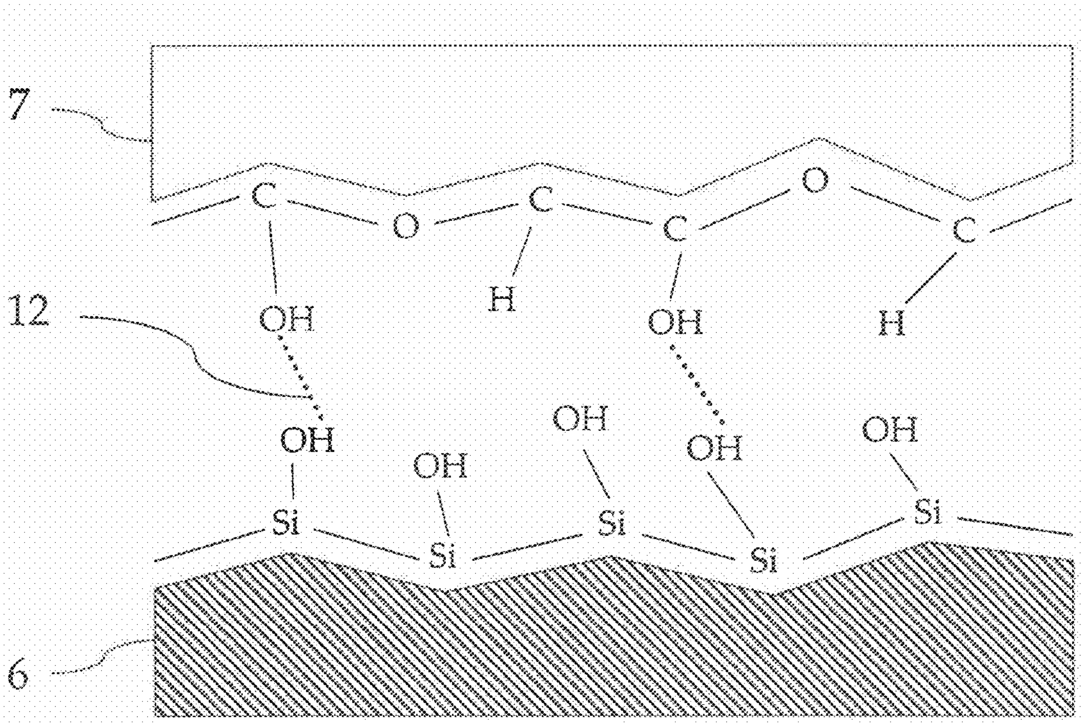
FIG. 5 is a schematic view of an interface between the glass cloth and the matrix resin in the radome according to Embodiment 1.

Next, the interface between the glass cloth 6 and the matrix resin 7 is schematically illustrated in FIG. 5. Since the glass cloth 6 has an outermost surface with a molecular structure in which there are a large number of polar groups such as a hydroxy group, a hydrogen bond 12 is easily formed with high density between the polar groups such as hydroxy groups of the glass cloth 6 and the polar groups such as hydroxy groups of the matrix resin 7. Therefore, even when stress occurs in the interface between the glass cloth 6 and the matrix resin 7, the stress is sufficiently transmitted to the glass cloth 6, and thus plastic deformation is less likely to occur due to a sufficiently high adhesion force between the glass cloth 6 and the matrix resin 7.

In the radome 1 of this embodiment, the glass cloth 6 is disposed at the inner side of the radome (i.e., in the vicinity of the radome inner surface 11) where the elongation strain in the plane direction is the largest to thereby form the glass cloth-containing area layer 9. Even when a load is applied to the radome 1 in the thickness direction from the outside environment side, stress is sufficiently transmitted to the glass cloth 6, and plastic deformation is less likely to occur.

In contrast, the dielectric constant of the radome 1 can be reduced by the use of a material having a lower dielectric constant. However, the effect of reducing the dielectric constant of the radome 1 does not vary depending on the position of the material having a lower dielectric constant in the thickness direction. Therefore, by disposing the olefin woven material 5 serving as the material having a lower dielectric constant at the outer side of the radome with respect to the glass cloth 6, the dielectric constant of the radome 1 can be reduced to thereby improve the transmission loss of radio waves.

It should be noted that, in this embodiment, the glass cloth 6 is disposed at the inner side of the radome where the elongation strain in the plane direction is the largest to thereby form the glass cloth-including area layer 9, whereby plastic deformation is less likely to occur. Therefore, even when the olefin woven material 5 is disposed closer to the outer side of the radome than the glass cloth 6, the structural strength of the radome 1 is sufficiently secured.

Moreover, in the radome 1 of this embodiment, by using the olefin woven material 5 and the glass cloth 6 as reinforced fibers, and integrating them with one matrix resin 7, the boundaries of each area layer are not made clear. Therefore, reflection (side lobe) of a radio wave can be suppressed to thereby improve the transmission loss of radio waves.

There is no limitation on the olefin woven material 5 used in this embodiment, and any substances known in the art can be used.

It is preferable that the dielectric constant of the olefin woven material 5 be lower, and be lower than that of the glass fiber, specifically 4 or lower. When the dielectric constant thereof exceeds 4, a desired effect (effect of reducing a dielectric constant) to be obtained by the use of the olefin woven material 5 may not be achieved. Moreover, as the olefin woven material 5, woven materials using long fibers are preferable because the strength in the stretching direction can be maintained and the impregnation of the matrix resin 7 is facilitated. Further, from the viewpoint of increasing the adhesiveness with the matrix resin 7, the surface of the olefin woven material 5 may be subjected to surface treatment, such as corona discharge treatment.

A preferable example of the olefin woven material 5 includes a woven material formed of ultrahigh molecular weight polyethylene fiber. Such a woven material can reflect the outstanding tensile strength and elastic modulus to the properties of the radome 1. As the ultrahigh molecular weight polyethylene fiber, Dyneema (dielectric constant: 2.2, molecular weight: 4,000,000) commercially available from Toyobo Co., Ltd., can be used, for example.

In the radome 1 of this embodiment, the portion where the olefin woven material 5 has been impregnated with the matrix resin 7 forms the olefin woven material-containing area layer 8. It is preferable that the thickness of the olefin woven material-containing area layer 8 be 1/20 or lower of a wavelength of a target radio wave from the view point of preventing the reflection of the target radio wave in the radome 1. When the thickness thereof exceeds 1/20 of a wavelength of the target radio wave, reflection of the object radio wave may occur in the radome 1. Here, there is no limitation on the target radio wave, and a broadband radio wave including a high frequency region from several GHz to 40 GHz is acceptable.

Moreover, the radome 1 of this embodiment is structured in such a manner that: a portion through which the target radio wave passes and a portion through which the target radio wave does not pass are separated; electrical properties are prioritized in the portion through which the target radio wave passes; and mechanical properties are prioritized in the portion through which the target radio wave does not pass. Specifically, it can be structured in such a manner that, in the portion through which the target radio wave does not pass, no olefin woven material 5 is disposed, i.e., the olefin woven material-containing area layer 8 is not formed. This is because the dielectric constant does not need to be decreased in the portion through which the target radio wave does not pass; and when the olefin woven material-containing area layer 8 is not formed, the design flexibility, the tensile strength, and the elastic modulus of the radome 1 become high, which makes it possible to partially increase the structural strength of the radome 1.

Moreover, in the portion through which the target radio wave does not pass, the glass cloth 6 can be disposed in place of the olefin woven material 5 from the viewpoint of improving workability. Further, from the viewpoint of improving the buckling resistance, the thickness of portions through which the target radio wave does not pass can be increased as compared with portions through which the target radio wave passes.

There is no limitation on the glass cloth 6 used in this embodiment, and any substances known in the art can be used.

Examples of the glass cloth 6 include a cloth using NE-Glass (manufactured by Nitto Boseki Co., Ltd., dielectric constant: 4.7) which is a glass cloth having low dielectric properties. Moreover, since a glass fiber generally has a large number of hydroxy groups and is easily subjected to surface treatment such as coupling agent treatment so as to improve the adhesiveness with the matrix resin 7, cloth using other glass fibers such as E-Glass, D-Glass, and T-Glass can also be used.

In the radome 1 of this embodiment, at a portion where the glass cloth 6 has been impregnated with a matrix resin 7, the glass cloth-containing area layer 9 is formed. It is preferable that the thickness of the glass cloth-containing area layer 9 be 1/20 or lower of a wavelength of a target radio wave from the viewpoint of preventing the reflection of the target radio wave in the radome 1. When the thickness exceeds 1/20 of a wavelength of the target radio wave, the reflection of the object radio wave may occur in the radome 1.

There is no limitation on the matrix resin 7 used in this embodiment, and any substances known in the art can be used.

In view of the manufacturability of the radome 1, as the matrix resin 7, a liquid thermosetting resin capable of securing impregnation properties in an uncured state is preferable. Moreover, a resin having hydroxy groups with high density after curing to thereby facilitate formation of a hydrogen bond or a resin having a functional group which chemically bonds with a coupling agent when the glass cloth 6 is subjected to coupling agent treatment is preferable.

Examples of the matrix resin 7 include epoxy resins, vinyl ester resins, unsaturated polyester resins, and silicone resins.

There is no limitation on a curing agent for the matrix resin 7, and any substances known in the art can be used. Examples of the curing agent include organic peroxides and acid anhydrides.

Moreover, the blending amount of the curing agent is not limited, and is suitably determined in accordance with the types of the matrix resin 7 and the curing agent.

Because the radome 1 of this embodiment having such a structure has excellent transmission loss of radio waves and structural strength, the structure of the radome 1 can be applied to a feedome requiring the same properties.

Next, a method of producing the radome 1 of this embodiment will be described.

The method of producing a radome in JP 2007-519298 T includes separately producing the first composite material facing, the second composite material facing, and the core, and laminating them to form a radome. Therefore, there are problems of a complicated production process and workability. In contrast, the method of producing the radome 1 of this embodiment is performed in a manner similar to a method of forming a generally-used fiber reinforced plastic which can be obtained by a simple production process and which has excellent workability.

Specifically, the radome 1 of this embodiment can be produced by laminating the olefin woven material 5 and the glass cloth 6, disposing the laminate in a mold, injecting the matrix resin 7 in the mold while evacuating the inside of the mold, and curing the matrix resin.

Here, usable as the mold may be an inner mold to which the internal shape of the radome 1 has been transferred and an outer mold to which the external shape of the radome 1 has been transferred. Moreover, a mold to which the whole shape of the radome 1 has been transferred can be used. In the case of using the inner mold, the glass cloth 6 may be disposed at the inner mold, and then the olefin woven material 5 may be laminated thereon. In the case of using the outer mold, the olefin woven material 5 may be disposed at the outer mold, and then the glass cloth 6 may be laminated thereon.

For example, in the case of using the inner mold, a given number of the glass cloth 6 is disposed in the inner mold, and a given number of the olefin woven materials 5 are laminated thereon. Here, a mold releasing film may be applied to the inner mold as required.

Next, the glass cloth 6 and the olefin woven material 5 are covered with a mold releasing film, and a space between the periphery part of the mold releasing film and the inner mold is sealed in such a manner as to maintain airtightness. Thereafter, an uncured liquid matrix resin 7 is injected in the inner mold through a resin inlet port preformed on the inner mold while evacuating a space between the mold releasing film and the inner mold to thereby impregnate the glass cloth 6 and the olefin woven material 5 with the matrix resin 7. Here, when the impregnation rate of the matrix resin 7 is low, an outlet port of the matrix resin 7 is preformed on the inner mold, and degassing is performed from the outlet port, thereby increasing the impregnation rate thereof.

Next, the inner mold is heated for a given period of time to cure the matrix resin 7, and then the radome 1 is released from the inner mold. After releasing, by further heating the matrix resin 7, the matrix resin 7 is sufficiently cured. Here, the heating time and the heating temperature are not limited, and may be suitably determined in accordance with the dimensions of the radome 1 to be produced and the type, etc., of the matrix resin to be used.

In the case of using the outer mold, the radome 1 can be produced similarly to the case of using the inner mold as described above, except that a given number of the olefin woven material 5 is disposed in the outer mold, and a given number of glass cloth 6 is laminated thereon.

In the case of using a mold to which the whole shape of the radome 1 has been transferred, the radome 1 can be produced in the same manner as described above, except that a given number of the olefin woven material 5 and the glass cloth 6 are disposed in such a manner that the olefin woven material is disposed at the outer side of the radome 1 and the glass cloth 6 is disposed at the inner side of the radome 1. It should be noted that, in the case of using the mold to which the whole shape of the radome 1 has been transferred, a pressure may be applied so as to increase the impregnation rate of the matrix resin 7.

According to the above-mentioned production methods, when the structures of the portion through which the target radio wave passes and the portion through which the target radio wave does not pass are made different from each other, the radome 1 having a desired structure can be produced by disposing the olefin woven material 5 and the glass cloth 6 in accordance with the structure or using a mold produced in accordance with the structure, without sharply reducing the productivity.

The radome 1 produced as described above can be suitably subjected to a drilling process or the like so as to fix the radome 1 to the base 2 with the fixation screws or the like.

Embodiment 2

Figure 6:
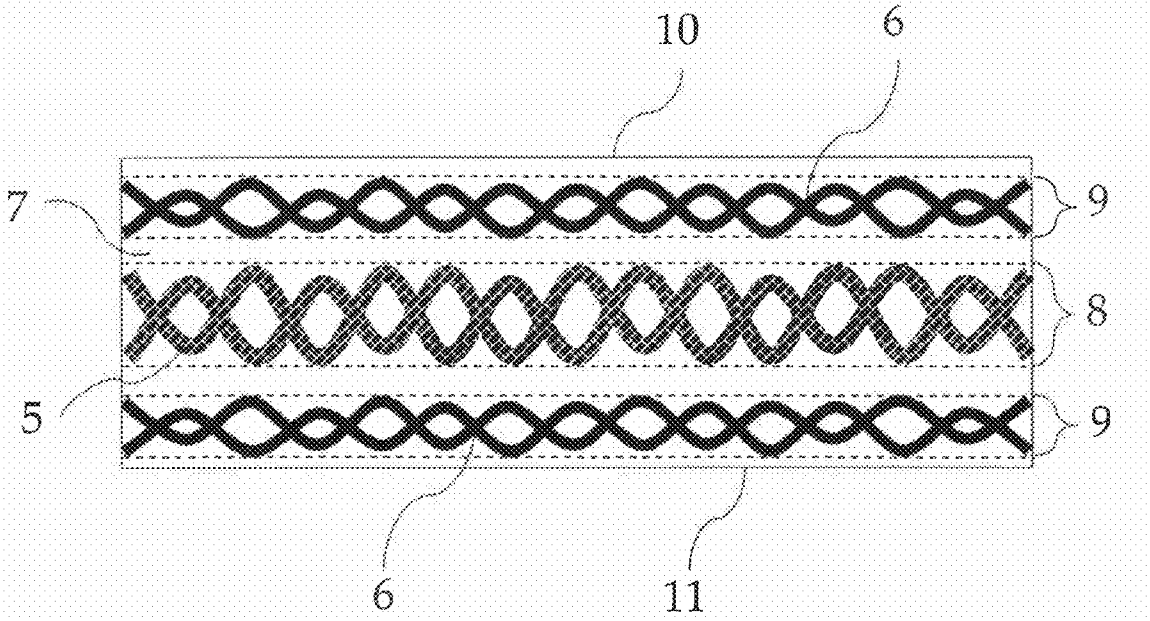
FIG. 6 is an enlarged cross sectional view illustrating a part of a radome according to Embodiment 2.

FIG. 6 is an enlarged cross sectional view illustrating a part of a radome 1 according to this embodiment. Since the essential parts of the radome 1 of this embodiment are the same as those of the radome 1 of Embodiment 1, only different parts from those of the radome 1 of Embodiment 1 will be described. In FIG. 6, the radome 1 is formed of a substance in which the olefin woven material 5 and the glass cloth 6 have been impregnated with the matrix resin 7 and are integrated with each other. Two pieces of glass cloth 6 are disposed at the outer side and at the inner side of the radome respectively. Between the two pieces of glass cloth 6, the olefin woven material 5 is disposed. A portion where the olefin woven material 5 has been impregnated with the matrix resin 7 forms the olefin woven material-containing area layer 8, and a portion where the glass cloth 6 has been impregnated with the matrix resin 7 forms the glass cloth-containing area layer 9. Further, the outside environment is in contact with radome outer surface 10, and the internal space where the radio wave device 3 is disposed is in contact with radome inner surface 11. It should be noted that, although FIG. 6 illustrates one olefin woven material 5 and two pieces of glass cloth 6, a plurality of olefin woven material 5 and glass cloth 6 may be used insofar as the positional relationship between the olefin woven material 5 and the glass cloth 6 is satisfied.

When a load is applied to the radome 1 in the thickness direction from the outside environment side by wind or the like, the radome 1 having such a structure can inhibit the compressive strain in the plane direction in the vicinity of the radome outer surface 10. Therefore, the structural strength of the radome 1 can be further increased. Moreover, in cases where a load is applied to the radome in the thickness direction from the inner side of the radome as well, it is difficult for plastic deformation to occur, and the structural strength of the radome 1 can be maintained.

In the radome 1 of this embodiment, it is preferable that the volume content of the glass cloth 6 in the glass cloth-containing area layer 9 at the outer side of the radome be smaller than the volume content of the glass cloth 6 in the glass cloth-containing area layer 9 at the inner side of the radome. Due to such a structure, buckling can be suppressed and the dielectric constant can be reduced.

Next, a method of producing the radome of this embodiment will be described.

The radome 1 of this embodiment can be produced by laminating the olefin woven material 5 and the glass cloth 6, placing the laminate in a mold, injecting the matrix resin 7 in the mold while evacuating the inside of the mold, and curing the matrix resin. The production method of the radome of this embodiment is the same as the production method of the radome 1 in Embodiment 1, except that, for example, a given number of the glass cloth 6 is disposed in an inner mold, and a given number of the olefin woven material 5 and glass cloth 6 are successively laminated thereon.

EXAMPLES

Hereinafter, the present invention will be described in detail according to the Examples, but is not limited thereto.

Example 1

NE-Glass (glass cloth, thickness: 0.16 mm) was disposed in an inner mold, and a woven material (olefin woven material, thickness: 0.63 mm) using an ultrahigh molecular weight polyethylene fiber was laminated thereon. Next, the NE-Glass and the woven material were covered with a mold releasing film, and the space between the periphery part of the mold releasing film and the inner mold was sealed in such a manner as to maintain airtightness. Thereafter, a mixture of vinyl ester resin (matrix resin, Repoxy R7070, manufactured by Showa High Polymer Co., Ltd.) and a curing agent (organic peroxide, PERMEK N, manufactured by NOF CORPORATION) was injected in the inner mold through a resin inlet port preformed on the inner mold while evacuating the space between the mold releasing film and the inner mold for impregnation. Here, 1 part by weight of the curing agent was used based on 100 parts by weight of vinyl ester resin. Next, the resultant was heated at 100° C. for 120 minutes to cure the vinyl ester resin. Then, the resultant was released from the inner mold to thereby obtain a radome. In the radome thus obtained, the volume content of the olefin woven material in an olefin woven material-containing area layer was 55%, the volume content of the glass cloth in a glass cloth-containing area layer was 35%, and the thickness of the radome was 0.92 mm.

Comparative Example 1

A radome was obtained in the same manner as in Example 1, except only woven materials (two pieces) using an ultrahigh molecular weight polyethylene fiber were laminated, and the laminate was disposed in an inner mold. In the radome thus obtained, the volume content of the olefin woven material was 55% and the thickness thereof was 0.94 mm.

Comparative Example 2

A radome was obtained in the same manner as in Example 1, except only NE-Glasses (14 pieces) were laminated and the laminate was disposed in an inner mold. In the radome thus obtained, the volume content of the glass cloth was 35% and the thickness thereof was 1.13 mm.

The radomes of Example 1, and Comparative Examples 1 and 2 were measured for dielectric constant and dielectric loss tangent at 10 GHz by a cavity resonator perturbation method and for elastic modulus in the bending direction by a dynamic mechanical analyzer. Further, the radio wave transmission loss at 10 GHz was measured by disposing the radome between two opposed horn reflectors, and observing the radio wave transmission with a network analyzer. The measurement results are shown in Table 1.

TABLE 1

| | Example 1 | Comparative Example 1 | Comparative Example 2 |
|---|---|---|---|
| Dielectric constant | 2.7 | 2.5 | 3.5 |
| Dielectric loss tangent | 0.0088 | 0.0087 | 0.0095 |
| Elastic modulus (GPa) | 18 | 17 | 22 |
| Transmission loss (dB) | 0.6 | 0.5 | 1.2 |

As is revealed from Table 1, the values of the dielectric constant, the dielectric loss tangent, and the radio wave transmission loss at 10 GHz of the radome of Example 1 were all smaller than the respective values of the radome of Comparative Example 2 and were almost the same as the respective values of the radome of Comparative Example 1. Therefore, it is revealed that the radome of Example 1 has a dielectric constant almost the same as that of Comparative Example 1, and has excellent transmission loss of radio waves.

Next, the radomes of Example 1, and Comparative Examples 1 and 2 were evaluated for the degree of plastic deformation. The evaluation was performed by cutting the produced radome into a panel shape, placing the resultant in a three-point bending tester with a distance between supporting points of 20 mm, applying a load of 5 N for 1 hour, and measuring the changes with time in the deformation when the load was adjusted to 0 N. The results are shown in FIG. 7.

Figure 7:
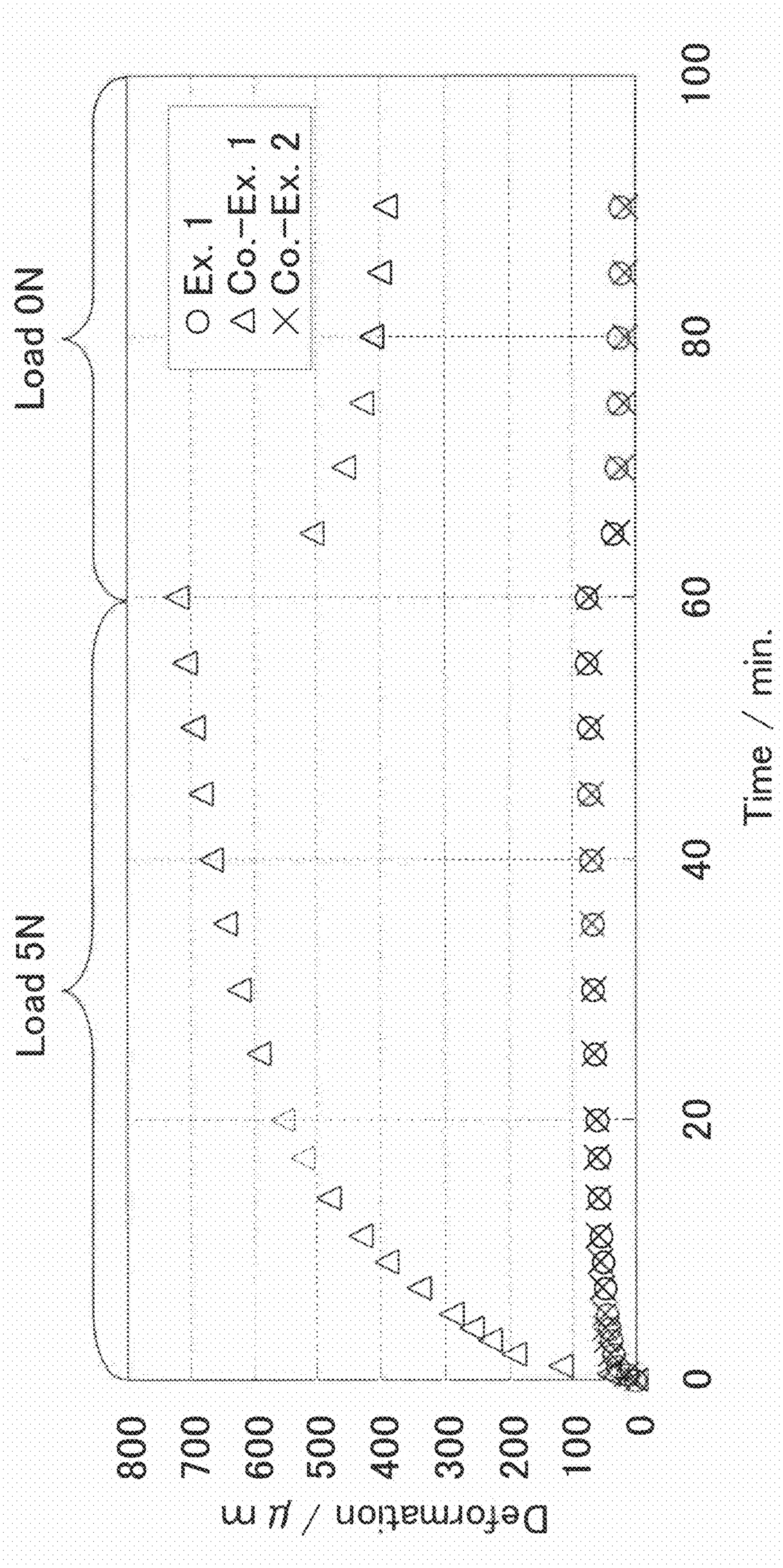
FIG. 7 is a graph illustrating changes with time in a deformation of the radome of each of Example 1 and Comparative Examples 1 and 2.

As shown in FIG. 7, the radome of Comparative Example 1 was sharply deformed when a load was applied, and, in contrast, the radome of Example 1 was barely deformed similar to the radome of Comparative Example 2 even when a load was applied. Therefore, it is revealed that the radome of Example 1 is less likely to suffer from plastic deformation and has excellent structural strength.

Thus, it can be said that the radome of Example 1 has excellent transmission loss of radio waves and structural strength as compared with the radomes of Comparative Examples 1 and 2.

As is revealed from the results described above, the present invention can provide a radome which has excellent transmission loss of radio waves and structural strength, which can be easily produced, and which has favorable workability, and a method of producing the same.

What is claimed is:

1. A radome comprising an olefin woven material and a glass cloth, wherein the olefin woven material and the glass cloth are impregnated with a matrix resin to be integrated with each other, and the glass cloth is disposed closer to an inner side of the radome than the olefin woven material.

2. A radome comprising an olefin woven material and two or more pieces of glass cloth, wherein the olefin woven material and the glass cloth are impregnated with a matrix resin to be integrated with each other, one glass cloth being disposed closer to an inner side of the radome than the olefin woven material, and other glass cloth being disposed closer to an outer side of the radome than the olefin woven material.

3. A radome according to claim 2, wherein a volume content of the glass cloth in a glass cloth-containing area layer at the outer side of the radome is smaller than a volume content of the glass cloth in a glass cloth-containing area layer at the inner side of the radome.

4. A radome according to claim 1 or 2, wherein a thickness of each of an olefin woven material-containing area layer and a glass cloth-containing area layer is $1/20$ or lower of a wavelength of a target radio wave.

5. A radome according to claim 1 or 2, wherein a portion through which a target radio wave is not transmitted is free of the olefin woven material-containing area layer.

6. A radome according to claim 1 or 2, wherein the olefin woven material is a woven material formed of an ultrahigh molecular weight polyethylene fiber.

7. A radome according to claim 1 or 2, wherein the matrix resin is an epoxy resin, a vinyl ester resin, an unsaturated polyester resin, or a silicone resin.

8. A method of producing a radome, comprising:

laminating an olefin woven material and a glass cloth to form a laminate;

disposing the laminate in a mold;

injecting a matrix resin in the mold while evacuating an inside of the mold; and curing the matrix resin.

* * * * *